United States Patent
Baker (10) Patent No.: US 6,445,530 B1
(45) Date of Patent: Sep. 3, 2002

(54) CLASS AB H-BRIDGE USING CURRENT SENSING MOSFETS

(75) Inventor: John M. Baker, Tuttle, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/407,222

(22) Filed: Sep. 24, 1999

Related U.S. Application Data (60) Provisional application No. 60/101,880, filed on Sep. 25, 1998.

(51) Int. Cl.⁷ .............................................. G11B 5/596
(52) U.S. Cl. ..................................... 360/78.04; 360/67
(58) Field of Search ................................ 318/254, 439, 318/138, 375, 368, 293; 360/75, 67, 78.12, 78.04; 330/146, 277, 293

(56) References Cited

U.S. PATENT DOCUMENTS

| | | | |
|---|---|---|---|
| 4,821,125 A | | 4/1989 | Christensen et al. |
| 5,191,297 A | * | 3/1993 | Penman et al. ............. 330/146 |
| 5,262,907 A | | 11/1993 | Duffy et al. |
| 5,287,046 A | * | 2/1994 | Carpenter et al. .......... 318/293 |
| 5,610,776 A | | 3/1997 | Oh |
| 5,687,036 A | | 11/1997 | Kassab |
| 5,838,515 A | * | 11/1998 | Mortazavi et al. ....... 360/78.12 |

OTHER PUBLICATIONS

"Data sheet for Motorola MC33362 High Voltage Switching Regulator, Motorola Analog IC Device Data, downloaded from Motorola website Feb. 11, 2000 www.Motorola.com".

"Data sheet for Motorola MC33363 High Voltage Switching Regulator, Motorola Analog IC Device Data, downloaded from Motorola website Feb. 11, 2000 www.Motorola.com".

"Data sheet for Motorola MC33363 A High Voltage Switching Regulator, Motorola Analog IC Device Data, downloaded from Motorola website Feb. 11, 2000 www.Motorola.com".

"Data sheet for Motorola MC33363B High Voltage Switching Regulator, Motorola Analog IC Device Data, downloaded from Motorola website Feb. 11, 2000 www.Motorola.com".

"Data sheet for Motorola MC33365 High Voltage Switching Regulator, Motorola Analog IC Device Data, downloaded from Motorola website Feb. 11, 2000 www.Motorola.com".

\* cited by examiner

*Primary Examiner*—David Hudspeth
*Assistant Examiner*—K. Wong
(74) *Attorney, Agent, or Firm*—Crowe & Dunlevy (57) ABSTRACT

An apparatus and method for supplying bi-directional load current to a load device. Four current sensing metal oxide semiconductor field effect transistors are operably configured to form an H-bridge with the load device, each transistor having separately insulated gate, source and drain and sense terminals with a source to drain conductivity determined in relation to a voltage applied to the gate terminal and a sense current from the sense terminal determined in relation to a magnitude of source to drain current. Drive voltages are applied to the gate terminals of alternating pairs of the transistors to apply the load current to the load device. The sense currents are used to provide adaptive, closed-loop clamping of the drive voltages at levels sufficient to maintain the non-load current conducting transistors in a quiescent state.

14 Claims, 6 Drawing Sheets

CLASS AB H-BRIDGE USING CURRENT SENSING MOSFETS

RELATED APPLICATIONS

This application claims the benefit of U.S. Provisional Application No. 60/101,880, filed Sep. 25, 1998.

FIELD OF THE INVENTION

This invention relates generally to the field of electrical control and signal processing devices, and more particularly, but not by way of limitation, to a method and apparatus for supplying controlled, bi-directional current to a device with minimal distortion at low currents.

BACKGROUND OF THE INVENTION

An H-bridge is a well known circuit construction that allows the application of bi-directional current to a load device, such as a motor that rotates in opposite directions or a coil that drives an audio speaker.

An H-bridge uses four switches, such as transistors, arranged in an "H" configuration. Each of the parallel "vertical portions" of the H-bridge is formed by serially connecting two of the switches; the load device is connected in series between the two vertical portions to form the "horizontal cross-member" of the H-bridge. For reference, this configuration is generally shown in prior art FIG. 3. The top of the bridge is connected to a voltage source and the bottom of the bridge is usually connected to ground.

Current is passed through the load device in alternate directions by controlling the conductivity of opposite pairs of the switches. Generally, only one of the two switches in each of the vertical portions will be "on" at a time to prevent passing the drive current straight down the vertical portions, bypassing the load device and damaging the switches (since at maximum load conditions the drive current can have a substantial magnitude).

A classification system has generally been adopted by the electronics industry to describe the driving characteristics of various types of driver circuits. As will be generally recognized, a "Class B" device provides bi-directional current to a load device, but suffers from a small amount of distortion at low current levels as the current transitions from a first polarity to the opposite polarity.-ease For example, an H-bridge that uses transistors, such as metal oxide semiconductor field effect transistors (MOSFETs), as the four switches and turns the nonconducting pair of transistors completely off, would generally behave as a Class B device, since a reversal in the polarity of the load current would require that the conducting pair of transistors be transitioned from a conducting to a non-conducting state and the nonconducting pair of transistors be transitioned from a nonconducting to a conducting state. Transistors (even fast MOSFETs) cannot change state instantaneously, and even in highly controlled manufacturing environments a population of discrete transistors will typically have transition characteristics that vary from part to part. Hence, this "transition delay" will result in noise in the applied current to the load device at very low levels of load current and at current polarity transitions.

A "Class AB" device, on the other hand, generally is described as a device that does not introduce such noise at low currents and at current polarity transitions. One common way to provide a Class AB H-bridge is to provide a small amount of quiescent current to the transistors sufficient to keep the nonconducting transistors "on" (at the lowest portions of the active region), but not sufficient to pass substantial amounts of current through the transistors. For example, an n-channel MOSFET conducts current from source to drain in relation to the magnitude of voltage impressed on a gate of the device. Thus, the gate voltage can be clamped to a low, non-zero value so that the device always at least conducts the quiescent current (and remains "operationally warm" as long as the circuit is active). A Class AB H-bridge can also be constructed using bi-polar transistors by supplying a small amount of current to the base of each transistor, but the power consumption (and heat dissipation) characteristics of such devices has led to a general migration toward the more efficient MOSFET technology for high performance applications.

While the passing of quiescent current through nonconducting transistors in an H-bridge has been successfully implemented, a pervasive problem faced by the industry is determining the appropriate voltage input necessary to obtain the desired current. Significant amounts of variation in gate-source voltage ($V_{GS}$) versus source-drain current ($I_D$) exist from part to part (and even over different temperature conditions), so an input voltage at the gate of one MOSFET in an H-bridge may be sufficient to establish the necessary quiescent conditions for that particular MOSFET, but insufficient for another MOSFET in the same H-bridge.

One prior art approach to resolving this condition is to fabricate all four MOSFETs of the H-bridge at the same time on the same semiconductor die in a lateral configuration. This will generally provide all of the MOSFETs with generally the same electrical response characteristics. Since semiconductor devices have response characteristics that are proportional to area., a fifth, proportionally smaller MOSFET can additionally be provided on the die. During operation of the H-bridge, circuitry can be used to adaptively determine a voltage sufficient to maintain the fifth MOSFET in the quiescent state and this voltage is then used on the remaining four MOSFETs in the H-bridge.

While operable, one significant drawback is the cost of such a circuit, since lateral MOSFET construction uses a relatively large amount of die area, and this can be significant especially in high current capacity MOSFETs. For this reason, semiconductor manufacturers are largely migrating away from lateral construction in favor of vertical construction, which is more efficient and generally provides more uniform conduction characteristics over a wider operational range. A vertical MOSFET generally comprises an array of very small transistor cells that are connected in parallel, with one laterally extending surface of the die (the "top") metallized to form the source and the opposing side (the "bottom") metallized to form the drain. The use of vertical MOSFETs, however, removes the ability to easily implement the "fifth" MOSFET approach, due to interconnection constraints.

There is a need, therefore, for an improved approach to providing an H-bridge driver circuit that exhibits Class AB characteristics that can be implemented in an inexpensive and efficient manner, without the drawbacks of the prior art. It is to such improvements that the present invention is directed.

SUMMARY OF THE INVENTION

The present invention provides an apparatus and method for supplying load current to a load device.

In accordance with preferred embodiments, a disc drive comprises an actuator which supports a head adjacent a rotatable disc. A coil of the actuator is immersed in the magnetic field of a permanent magnet of a voice coil motor (VCM).

A servo circuit applies bi-directional current through the coil to rotate the actuator, and comprises four current sensing metal oxide semiconductor field effect transistors (SenseFETs) which are operably configured to form an H-bridge with the coil. Each transistor includes separately insulated source, drain, gate and sense terminals, with a source to drain conductivity determined in relation to a voltage applied to the gate terminal and a sense current from the sense terminal determined in relation to a magnitude of source to drain current. The transistors are preferably of vertical construction.

A driver circuit applies drive voltages to the gate terminals of alternating pairs of the transistors to pass a desired load current through the coil, with the drive voltages placing a selected pair of the transistors in a conductive state (to direct the load current through the coil) and the remaining pair of the transistors in a nonconductive state (to not conduct the load current passing through the coil).

A clamp circuit, connected to the gate terminals of at least one transistor from each of the pairs of the transistors, uses the sense current from the associated sense terminal in a closed-loop fashion to adaptively maintain the associated transistor in a quiescent state when the drive voltage drops to a value that would otherwise make the transistor enter a nonconductive state. In this way, the direction and magnitude of the load current can be readily varied to provide robust response, even at very low, fast changing coil currents.

These and various other features as well as advantages which characterize the present invention will be apparent from a reading of the following detailed description and a review of the associated drawings.

DETAILED DESCRIPTION

In order to set forth a detailed description of preferred embodiments of the present invention, it will be helpful to first briefly describe a particular environment in which such embodiments can be advantageously utilized.

Figure 1:
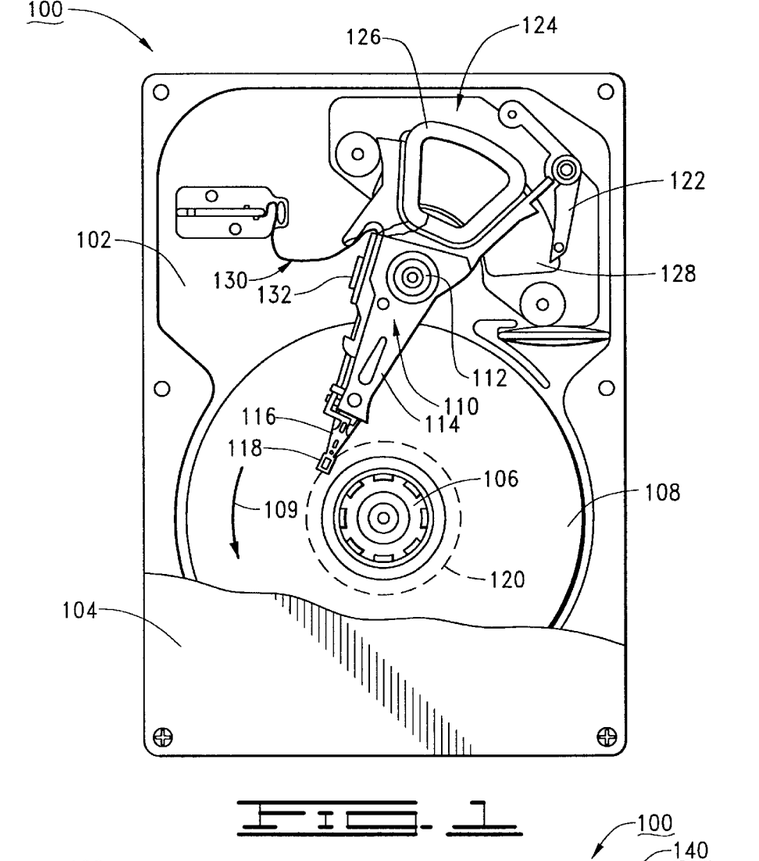
FIG. 1 provides a top plan view of a disc drive which provides an environment in which preferred embodiments of the present invention can be advantageously utilized.

FIG. 1 provides a top plan view of a disc drive 100 of the type used to interface with a host computer to magnetically store and retrieve user data. The disc drive 100 includes a base deck 102 to which various components of the disc drive 100 are mounted. A top cover 104 (shown in partial cutaway fashion) cooperates with the base deck 102 to form an internal, sealed environment for the disc drive.

A spindle motor (shown generally at 106) is provided to rotate a plurality of axially-aligned, rigid, magnetic recording discs 108 at a constant high speed (in thousands of revolutions per minute) in an angular direction denoted by arrow 109. User data are written to and read from tracks (not designated) on the discs 108 through the use of an actuator assembly 110, which rotates about a bearing shaft assembly 112 positioned adjacent the discs 108.

The actuator assembly 110 includes a plurality of rigid actuator arms 114 which extend toward the discs 108, with flexible suspension assemblies 116 (flexures) extending therefrom. Mounted at the distal end of each of the flexures 116 is a head 118 which includes a slider assembly (not separately designated) designed to fly in close proximity to the corresponding surface of the associated disc 108. The heads 118 are preferably characterized as magneto-resistive (MR) heads each having a thin-film inductive write element and an MR read element.

When the disc drive 100 is not in use, the heads 118 are moved over and come to rest upon landing zones 120 near the inner diameter of the discs 108 and the actuator assembly 110 is secured using a magnetic latch assembly 122.

The radial position of the heads 118 is controlled through the use of a voice coil motor (VCM) 124, which includes a coil 126 attached to the actuator assembly 110 as well as a permanent magnet 128 which establishes a magnetic field in which the coil 126 is immersed. A second magnetic flux path is disposed above the permanent magnet 128, but has not been shown for purposes of clarity. The heads 118 are moved across the surfaces of the discs 108 through the application of current to the coil 126.

A flex assembly 130 provides the requisite electrical connection paths for the actuator assembly 110 while allowing pivotal movement of the actuator assembly 110 during operation. The flex assembly 130 includes a preamplifier/driver circuit 132 (preamp) which applies write currents to the write elements of the heads 118 during a write operation and applies read bias currents to the MR read elements of the heads 118 during a read operation. The preamp 132 further amplifies readback signals obtained during a read operation and provides the same to disc drive control electronics (not shown) disposed on a disc drive printed circuit board (PCB) attached to the underside of the base deck 102.

Figure 2:
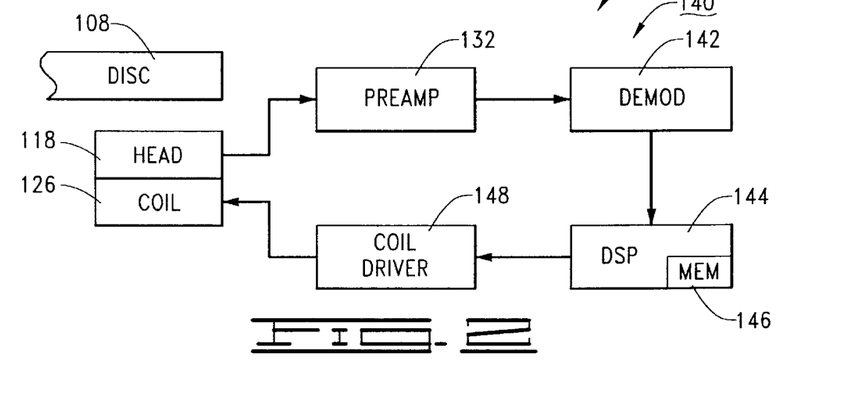
FIG. 2 provides a functional block diagram of a servo control circuit of the disc drive of FIG. 1, including a coil driver circuit constructed in accordance with preferred embodiments of the present invention.

FIG. 2 shows a functional block diagram of a servo circuit 140 of the disc drive 100 of FIG. 1 which uses servo data arranged on the discs 108 to control the position of the heads 118. The servo data are transduced by the selected head 118, preamplified by the preamp 132, and provided to a demodulation circuit 142 which conditions the servo data for processing by a servo processor 144, which preferably comprises a digital signal processor (DSP). The DSP 144 uses programming steps stored in DSP memory 146 (MEM) as well as commands issued by a top-level disc drive processor (not shown) to output current command signals to coil driver circuitry 148 which, in turn, adjusts the amount of current applied to the coil 126. Preferred construction and operation of the coil driver circuitry 148 will be discussed in greater detail below.

Figure 3:
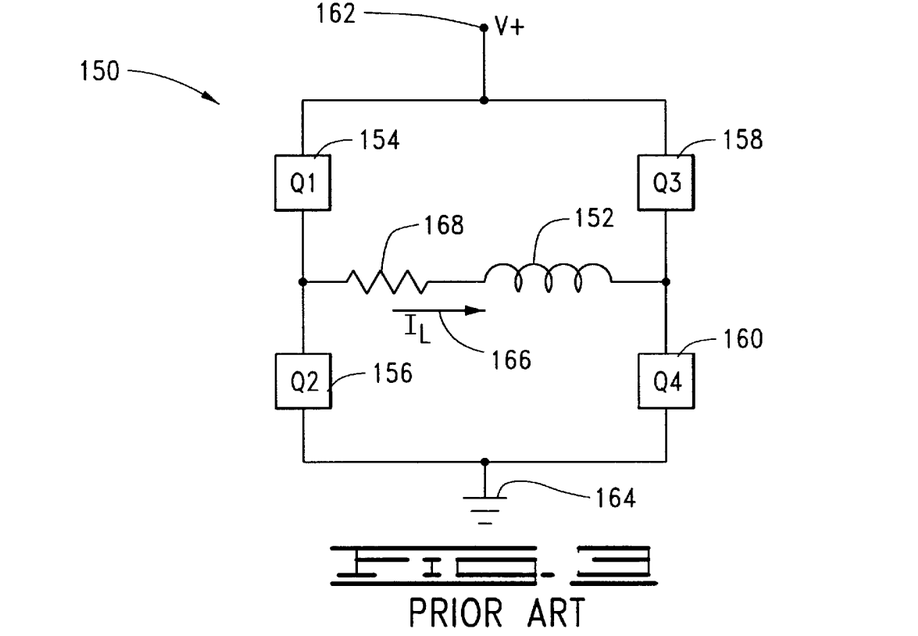
FIG. 3 is a generalized schematic diagram representing an H-bridge driver circuit, in accordance with the prior art.

FIG. 3 is a generalized schematic diagram of an H-bridge driver circuit 150 of the type used in the prior art to provide bi-directional current to a load device, such as coil 152. It will be recognized that the coil 152 can be a coil of a disc drive voice coil motor. Switches Q1, Q2, Q3 and Q4 are identified at 154, 156, 158 and 160 respectively and are controllably operated to pass load current $I_L$ through the coil 152 from a V+ voltage source terminal 162 to a ground terminal 164. For example, the Q1 and Q4 switches 154, 160 can be made conductive and the Q2 and Q3 switches 156, 158 made substantially nonconductive to pass current through the coil 152 in the direction denoted by arrow 166. By reversing these states, the current can readily be directed in the opposite direction through the coil 152. Voltage across a serially connected sense resistor 168 can be monitored to measure the load current.

Figure 4:
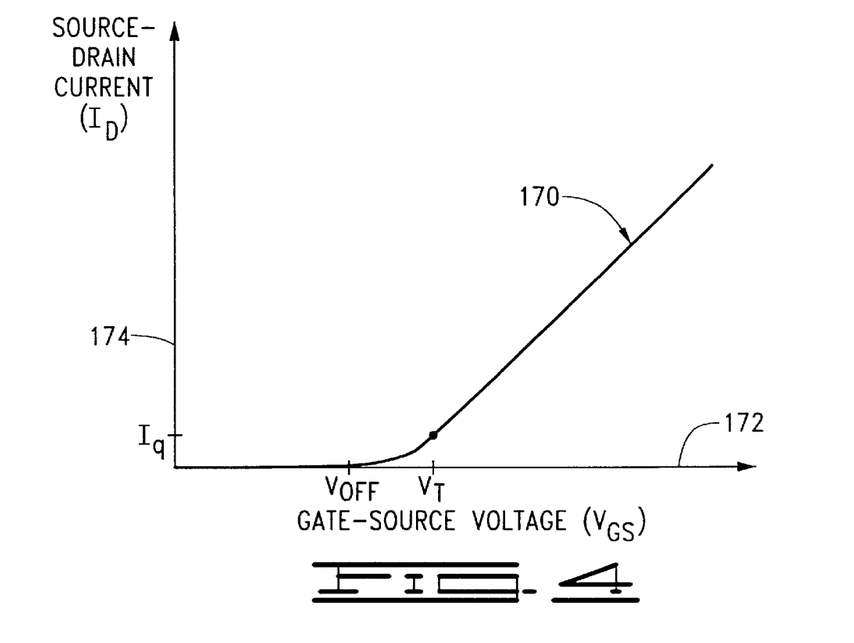
FIG. 4 is a graphical representation of the general relationship between a gate-source voltage ($V_{GS}$) and a source-drain current ($I_D$) for a metal oxide semiconductor field effect transistor (MOSFET).

One common way to implement the Q1, Q2, Q3 and Q4 switches 154, 156, 158 and 160 is through the use of metal oxide semiconductor field effect transistors (MOSFETs), which as will be recognized each have a source, a drain and a gate, with the voltage on the gate determining the conductivity between the source and drain. FIG. 4 shows a graphical representation of a response curve 170 for a typical MOSFET, plotted against an x-axis 172 indicative of gatesource voltage ($V_{GS}$) and a y-axis 174 indicative of source-drain current ($I_D$). It can be seen that below a certain threshold gate voltage ($V_{OFF}$) the MOSFET is nonconductive, and above this point the MOSFET begins to transition to an active, conductive state. It will be recognized that turning on the MOSFET from the nonactive to the active state will not occur instantaneously, but will involve a small amount of delay.

By applying a small threshold voltage $V_T$ to the gate, a small amount of quiescent current, Iq, on the order of perhaps 250 microamps ($\mu A$), can be passed through the MOSFET. The source-drain resistance ($R_{DS}$) will still be great enough to prevent passage of large amounts of current through the MOSFET, but the MOSFET can quickly be transitioned from this quiescent state to the active region, faster than from an initial $V_{GS}$ far below the $V_{OFF}$ level.

Referring again to FIG. 3, using MOSFETs as the Q1, Q2, Q3 and Q4 switches 154, 156, 158 and 160 and maintaining a small voltage on each gate can generally result in Class AB performance by the H-bridge 150. Thus, control circuitry can apply a range of voltages (from zero volts to several volts) to the gate of each MOSFET as desired to vary the conductivity of the MOSFETs to drive the coil 152. At the same time, separate circuitry also connected to the gate of each MOSFET can always apply a small amount of voltage to the gate to clamp the lower end of the gate input to a small, nonzero voltage, even when zero volts are otherwise being applied by the control circuitry.

Determining appropriate gate voltages $V_{GS}$ to achieve such performance, however, has been difficult to achieve in large scale manufacturing environments, since the general relationship shown in FIG. 4 can vary significantly from part to part and even within the same part under different environmental conditions. Too low a gate voltage leaves the MOSFET in the inactive region, introducing distortion into the load current as the MOSFET transitions to an active state; too high a gate voltage increases the conductivity of the MOSFET, undesirably reducing the load current and dissipating heat in the MOSFET. Of course, if the gate voltage is made sufficiently high, then the MOSFET becomes highly conductive, allowing substantial amounts of load current to bypass the coil 152 entirely and instead pass down the vertical portion of the bridge (such as from Q1 to Q2), damaging the bridge 150.

Figure 5:
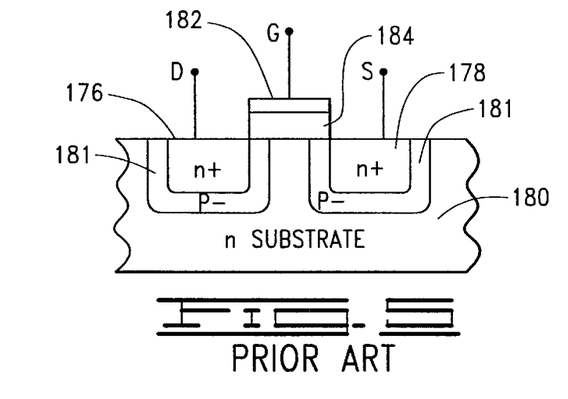
FIG. 5 provides a general representation of an n-channel MOSFET of lateral construction, in accordance with the prior art.
Figure 6:
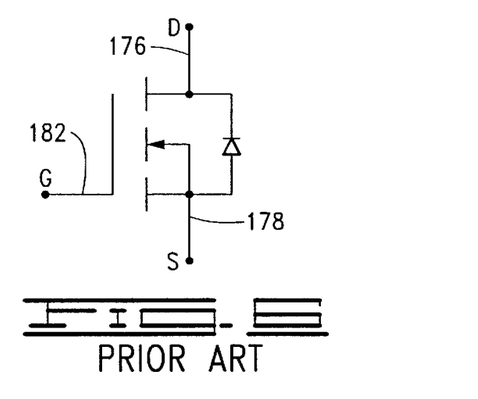
FIG. 6 is a schematic representation of an n-channel MOSFET, in accordance with the prior art.

In order to illustrate preferred embodiments of the present invention to overcome these limitations with the prior art, it will now be helpful to first briefly review various constructions of MOSFETs. FIG. 5 provides a simplified illustration of an n-channel MOSFET having a lateral construction. As will be recognized by those skilled in the art, drain and source regions 176, 178 are formed from highly doped n+ portions in an n substrate 180 isolated by p-regions 181. Conductivity between drain 176 and source 178 is controlled in relation to an electric field established by a voltage on a gate region 182, insulated from the gap between the drain 176 and source 178 by an insulating region 184. FIG. 6 shows a corresponding schematic representation of the MOSFET of FIG. 5.

As discussed above, the lateral MOSFET construction generally shown in FIG. 5 can be used to fabricate the Q1, Q2, Q3 and Q4 switches 154, 156, 158 and 160 of FIG. 3 onto the same n substrate 180, so that all of the MOSFETs have generally the same electrical response characteristics. A fifth, proportionally smaller MOSFET (not shown) can also be fabricated at the same time, allowing the appropriate gate voltage $V_{GS}$ for the four MOSFETs in the H-bridge 150 to be determined by monitoring the voltage and current characteristics of the fifth MOSFET.

Figure 7:
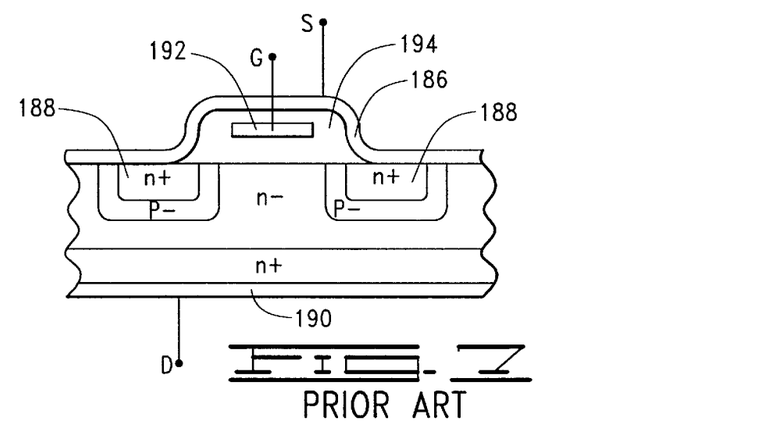
FIG. 7 provides a general representation of an n-channel MOSFET of vertical construction, in accordance with the prior art.

Semiconductor manufacturers are largely migrating away from such constructions due to cost and complexity in favor of vertical MOSFET constructions, as illustrated in the simplified diagram of FIG. 7. Those skilled in the art will recognize that a vertical MOSFET generally comprises an array of very small transistor cells that are connected in parallel. A source region 186 is provided as a laterally extending metallized surface across one side (the "top") of the semiconductor die, with a number of n-doped regions 188 in a p region. A drain region 190 is formed as a laterally extending metallized surface across the opposite side ("bottom") of the die. A gate region 192 is insulated within an insulating region 194. Application of a voltage to the gate 192 causes an electrical field that allows current to flow from the source 186 to the drain 190 in a vertical direction. An advantage of vertical construction is smaller die area as compared to lateral construction, and generally more linear current conduction characteristics at lower levels.

However, it is not practical to form an array of interconnected vertical devices on the same die, due to interconnection problems that arise in attempting to connect the tops (sources) and bottoms (drains) of adjacent devices on the die. It is true that discrete devices can be initially formed from the same die, cut, and then secured into the same package, but localized temperature differences will generally result during operation for the various devices, even if within the same package. For these reasons, the "fifth" sense MOSFET approach commonly employed for lateral MOSFETs has not been largely utilized for vertically constructed MOSFETs.

Figure 8:
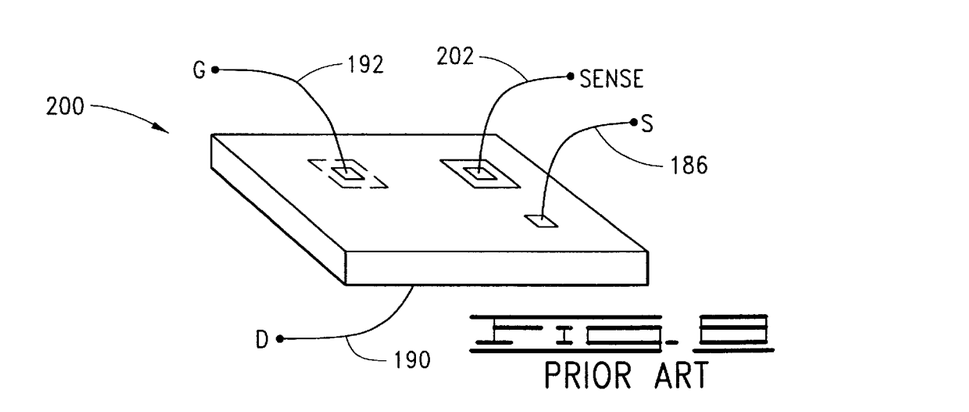
FIG. 8 is an isometric representation of a n-channel current sense MOSFET (also referred to as a SenseFET) having a vertical construction.

FIG. 8 shows a particular type of MOSFET referred to as a current sense MOSFET, or "SenseFET," generally denoted at 200. The SenseFET 200 has generally the same vertical construction as shown in FIG. 7, and so for convenience the same reference numerals from FIG. 7 have been utilized to identify the functional connections to the source, drain and gate (186, 190 and 192). However, the SenseFET has an additional sense connection 202, formed by isolating the source metalization of a small portion of the individual transistor cells. That is, with reference to FIG. 7, a few of the n doped regions 188 are electrically isolated from the metalization layer of the source 186 and instead bonded out on a separate connection pin. The source current detected at the sense connection 202 will be proportional (by area) to the load current carried by the remaining cells of the source 186.

Figure 9:
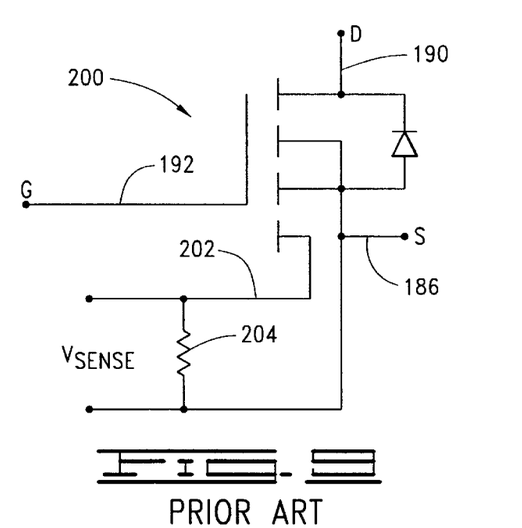
FIG. 9 provides a prior art representation of use of the SenseFET of FIG. 8 to sense source-drain current.

In the prior art, the sense connection 202 has been used to provide what has been described as "lossless" current sensing. For example, as shown in FIG. 9, placing a small resistor 204 between the sense connection 202 and the source 186 and detecting the voltage across the resistor can be used to provide an indication of load current. While operable for large values of load current (such as several amps), errors arise in sensing accuracy due to, for example, different effective gate-source voltage ($V_{GS}$) between the gate 192 and the sense connection 202 as compared to between the gate 192 and the actual source 186.

Figure 10:
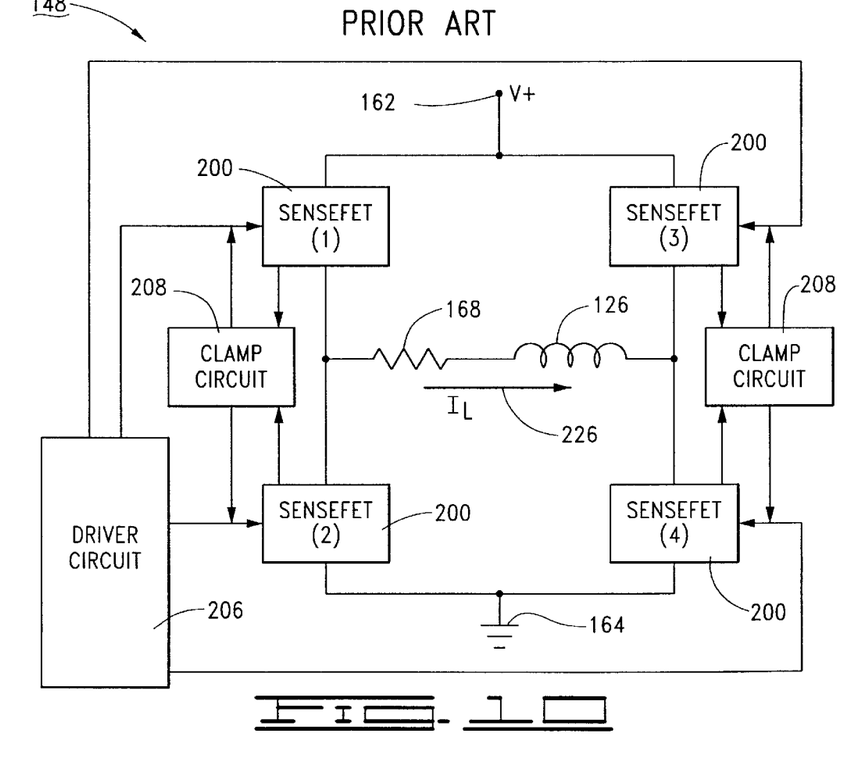
FIG. 10 is a functional block representation of the coil driver circuitry of the servo circuit of FIG. 2, in conjunction with the actuator coil, constructed in accordance with preferred embodiments of the present invention.

The present invention, as embodied herein and claimed below, uses the output on the sense connection 202 as a closed-loop feedback signal to adaptively control the level of quiescent current Iq through the SenseFET 200. With reference first to FIG. 10, shown therein is a representation of relevant portions of the coil driver circuitry 148 of FIG. 2, in conjunction with the actuator coil 126. The coil driver circuitry 148 uses four n-channel SenseFETs 200 (also referred to as "FETs") in an H-bridge configuration, generally as discussed above in FIG. 3, to apply bidirectional current to the coil 126. A driver circuit 206 applies voltages to the gates 192 of the respective FETs 200 in a conventional fashion. Although omitted for clarity, it will be understood that additional feedback connections are provided from the coil 126 to the driver circuit 206.

Significantly, clamp circuitry (represented by clamp circuits 208) is provided to clamp the lowest voltage levels output by the driver circuit 206 to levels sufficient to maintain the SenseFETs in a quiescent state when not used to conduct load current.

Figure 11:
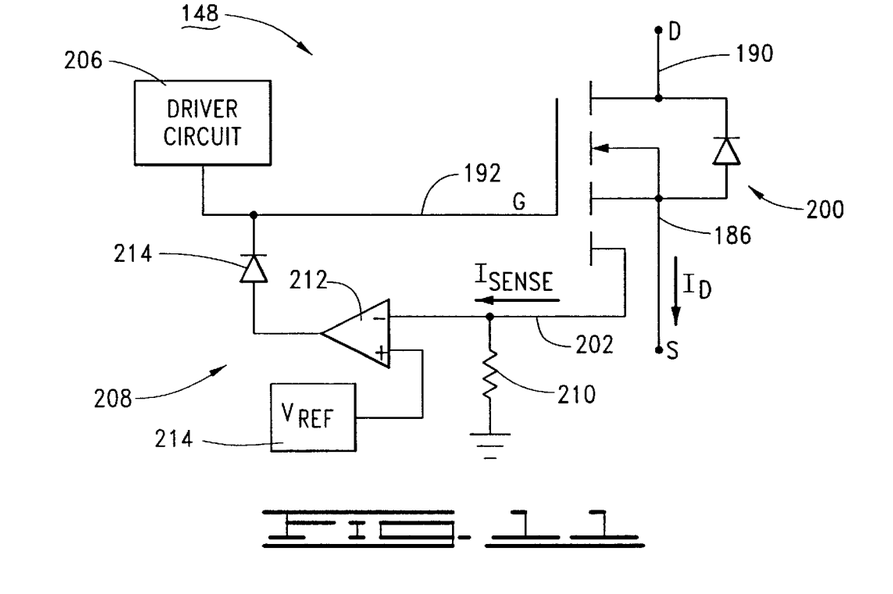
FIG. 11 is a schematic representation of a preferred embodiment of the clamp circuit of FIG. 10.

FIG. 11 shows a preferred construction for a portion of the clamp circuits 208. Only one of the FETs 200 is shown in FIG. 11, but it will be understood that the circuitry of FIG. 11 is preferably duplicated for each of the FETs 200 in FIG. 10. In an alternative embodiment, the circuitry of FIG. 11 is only applied to the high-side FETs 200 (i.e., those closest to the V+ terminal 162) and the remaining low-side FETs 200 (closest to the ground terminal 164) are allowed to go to fully deactive states when not conducting the load current. The high-side FETs will typically have a longer transition time than the low-side FETs, because the gate voltage of the high-side FETs must be driven from zero volts to a value just above one-half the supply voltage at terminal 162 in order to turn on these FETs, while the low-side FETs only need to be driven from ground up to the $V_T$ value. Quiescent current can therefore be eliminated entirely for the low-side FETs if the transition time is sufficiently short.

Continuing with FIG. 11, the clamp circuit 208 uses a sense current ($I_{SENSE}$) output from the sense connection 202 as a feedback signal to apply an appropriate gate voltage $V_{GS}$ to the gate to maintain the drain current $I_D$ at a quiescent level. The sense current $I_{SENSE}$ generates a voltage with respect to ground across a resistor 210, and this voltage is supplied to the negative input of a differential amplifier 212. A reference voltage source 214 applies a reference voltage $V_{REF}$ to the positive input of the differential amplifier 212.

When no voltage is otherwise being supplied to the gate 192 by the driver circuit 206, the differential amplifier 212 will adjust its output voltage in an attempt to bring the voltage at the negative input terminal to a level equal to $V_{REF}$. If $I_{SENSE}$ is too high, the amplifier 212 will reduce the output voltage, and vice versa. In this way, the lowest output from the driver circuit 206 (such as zero volts) will be clamped to a small, nonzero value sufficient to sustain quiescent operation of the FET 200. Appropriate values for $V_{REF}$ and the resistance of the resistor 210 can be selected to maintain the quiescent current at or above a desired level, even in the presence of a wide range of variation due to manufacturing processes or environmental conditions.

It is important to note that the FET 200 will provide reliable operation in the H-bridge of FIG. 11 over a large range of quiescent current values, as long as the minimum value is met or exceeded. For example, if the minimum quiescent current is selected to be 3 milliamps, the quiescent current can double or triple in magnitude (up to, for example, 10 milliamps or more) without adversely affecting the operation of the H-bridge, due to the construction of the FETs 200.

When the driver circuit 206 does output a nonzero control voltage to the FET 200 to pass load current through the coil 126, a diode 214 isolates this voltage from the output terminal of the amplifier 212. During such operation, the amplifier 212 may experience a state of non-equilibrium at its input terminals since the $I_{SENSE}$ magnitude will be determined by the magnitude of the load current passing through the FET 200, but such will not adversely affect the operation of the circuit.

Figure 12:
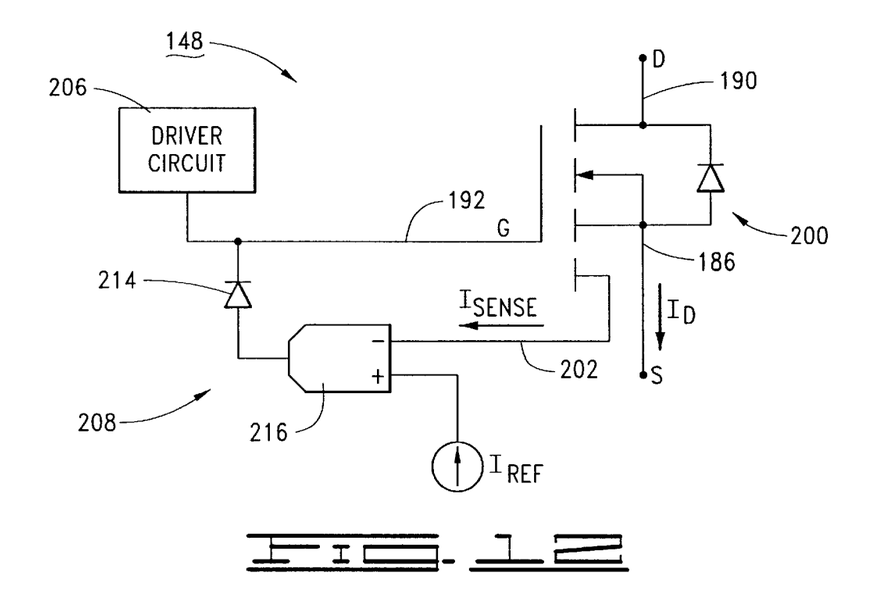
FIG. 12 is a schematic representation of an alternative preferred embodiment of the clamp circuit of FIG. 10.

FIG. 12 provides another preferred embodiment for the clamp circuit 208. The circuit of FIG. 12 utilizes a transconductance amplifier 216 to provide an output voltage in relation to the difference between the $I_{SENSE}$ current from the sense connection 202 and a reference current $I_{REF}$ from a reference current source 218. As before, at times when the driver circuit 206 is not passing load current through the FET 200, the transconductance amplifier 216 will operate to increase or decrease the drain current $I_D$ to maintain an appropriate quiescent state for the FET 200, and will not otherwise interfere with the operation of the FET 200 to pass load current to the coil 126.

Figure 13:
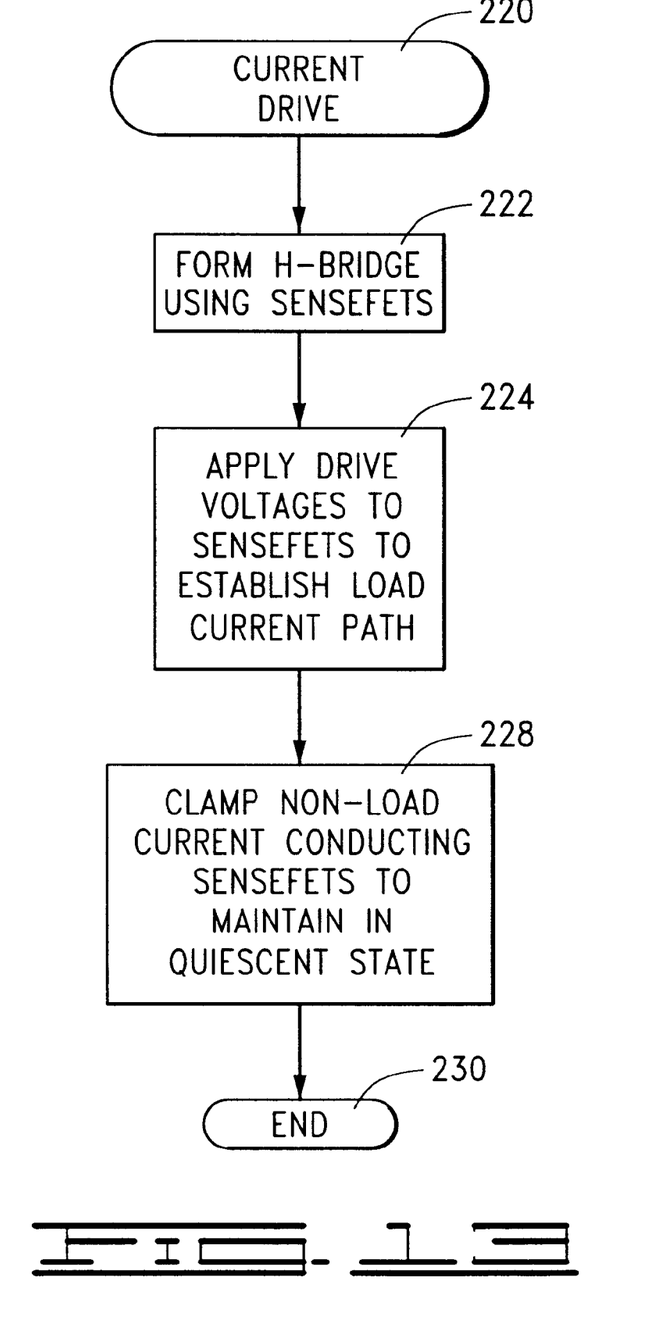
FIG. 13 is a flow chart for a DRIVE CURRENT routine, representative of steps carried out in accordance with preferred embodiments of the present invention.

The operation of the coil driver circuitry 148 of FIG. 10 can be summarized by a review of a CURRENT DRIVE routine 220 set forth by FIG. 13. At step 222, four current sensing metal oxide semiconductor field effect transistors (SenseFETs) 200 are operably configured to form an H-bridge with the coil, as shown in FIG. 10. It will be recognized that, as discussed above, each FET 200 has separately insulated gate, source, drain and sense terminals with a source to drain conductivity determined in relation to a voltage applied to the gate terminal and a sense current from the sense terminal determined in relation to a magnitude of source to drain current.

At step 224, drive voltages are applied to the gate terminals of alternating pairs of the transistors 200 to pass a desired load current through the coil 126. The drive voltages are selected to place a selected pair of the transistors in a conductive state and the remaining pair of the transistors in a nonconductive state. For example, to pass load current $I_L$ through the coil 126 in the direction indicated by arrow 226 (FIG. 10), the driver circuit 206 will apply nonzero voltages to the gates of the first and fourth FETs 200. This will establish the load current path from the V+ terminal 162, down through the first FET 200, across and through the coil 126, down through the fourth FET 200, and then to ground terminal 164. The magnitudes of these nonzero voltages will establish respective drain-source resistances ($R_{DS}$) of these transistors 200 to control the magnitude of the load current $I_L$ that passes through the coil 126. At the same time, the driver circuit will apply substantially zero volts to the remaining second and third transistors 200 in order to make these nonconductive to the load current.

As shown by step 228, the sense currents from the sense terminals will be used to clamp the drive voltages applied to the remaining pair of transistors (i.e., the non-load current conducting transistors) to levels sufficient to maintain the transistors in a quiescent state. Hence, although the drive voltages at the second and third transistors 200 will be zero volts, the clamp circuit 208 will prevent the actual voltages at these gates from falling below the desired level sufficient to maintain the transistors in a quiescent state. The routine is shown to end at 230, but it will be understood that the aforementioned steps 224, 226 are repeated as required.

It will now be clear that the present invention provides several advantages over the prior art. The Class AB H-bridge of FIG. 10 allows the use of discrete SenseFETs with vertical construction along with relatively simple feedback circuitry to provide robust quiescent control of either the high-side, or all, of the FETs in the H-bridge. While n-channel SenseFETs manufactured using a vertical manufacturing process have been disclosed for purposes of illustration, it will be readily understood that other types of devices, including p-channel devices and devices manufactured using other types of manufacturing processes, can readily be utilized.

In summary, the present invention is directed to an apparatus and method for supplying load current to a load device. In accordance with preferred embodiments, a disc drive 100 comprises an actuator 110 which supports a head 118 adjacent a rotatable disc 108. A coil 126 of the actuator is immersed in the magnetic field of a permanent magnet 128 of a voice coil motor (VCM) 124.

A servo circuit 140 applies bidirectional current through the coil to rotate the actuator, and comprises four current sensing metal oxide semiconductor field effect transistors (SenseFETs) 200 which are operably configured to form an H-bridge 148 with the coil. Each transistor includes separately insulated source 186, drain 190, gate 192 and sense terminals 202, with a source to drain conductivity determined in relation to a voltage applied to the gate terminal and a sense current from the sense terminal determined in relation to a magnitude of source to drain current. The transistors are preferably of vertical construction.

A driver circuit 206 applies drive voltages to the gate terminals of alternating pairs of the transistors to pass a desired load current through the coil, with the drive voltages placing a selected pair of the transistors in a conductive state and the remaining pair of the transistors in a nonconductive state (step 224).

A clamp circuit 208, connected to the gate terminals of at least one transistor from each of the pairs of the transistors, uses the sense current from the associated sense terminal to maintain the associated transistor in a quiescent state irrespective the magnitude of the drive voltage (step 228). In this way, the direction and magnitude of the load current can be readily varied to provide robust response, even at very low, fast changing coil currents.

For purposes of the appended claims, as will be readily understood by those skilled in the art, a current sensing metal oxide semiconductor field effect transistor will be understood to describe a SenseFET, such as discussed above at 200, which has at least four separate, electrically insulated connection terminals: a gate, drain, source, and sense. The sense terminal is electrically insulated from the source, and outputs a sense current that is proportional to source-drain current through the device. A driver circuit will be understood as a circuit that applies a voltage to a gate, such as disclosed at 206. A clamp circuit, and clamping, will be understood to describe establishing a boundary to a range of values, as discussed above with respect to the operation of the clamp circuit 208 which maintains the voltage at the gates of the FETs 200 above zero volts, even if the driver circuit 206 applies a voltage of zero volts.

A conductive state will be readily understood as a state wherein a transistor passes substantially all of the desired load current through the load device, such as illustrated for linear portions of the curve of FIG. 4 above the voltage $V_T$. A nonconductive state will be understood as a state wherein the transistor does not pass load current, such as illustrated for linear portions of the curve of FIG. 4 below the voltage $V_{OFF}$. A quiescent state will be readily understood as the passage of a small amount of source-drain current through a transistor sufficient to make the source-drain resistance ($R_{DS}$) lower than what is observed when the transistor is nonconductive, but greater than when the transistor is fully conductive, and allows faster transition to the active, conductive state, as discussed in FIG. 4 and as shown at $V_T$.

A transconductance amplifier will be readily understood as a device which converts an input current value to a corresponding output voltage value. An H-bridge will be readily understood as the configuration of four devices in an H relationship, with two devices in each vertical portion of the bridge and a load device connected in series therebetween.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. An apparatus which supplies a load current to a load device, comprising:

a current sensing metal oxide semiconductor field effect transistor having separately insulated gate, source and drain and sense terminals, with a source to drain conductivity determined in relation to a voltage applied to the gate terminal and a sense current from the sense terminal determined in relation to a magnitude of source to drain current;

a driver circuit which applies a drive voltage to the gate terminal, the drive voltage having a variable magnitude selected in relation to a desired load current through the load device; and a clamp circuit, connected to the gate terminal, which uses the sense current to generate a clamp voltage which is applied to the gate terminal to maintain the transistor in a quiescent state when the drive voltage would otherwise place the transistor in a nonconductive state.

2. The apparatus of claim 1, wherein the clamp circuit comprises:
 a reference voltage generator which generates a reference voltage;
 a resistor which generates a sense voltage in relation to a voltage drop across the resistor as the sense current passes through the resistor; and
 a differential amplifier, connected to the reference voltage generator and the resistor, which outputs the clamp voltage in relation to a difference between the reference voltage and the sense voltage.

3. The apparatus of claim 1, wherein the clamp circuit comprises:
 a reference current generator which generates a reference current; and
 a transconductance amplifier, connected to the reference current generator and the sense terminal, which outputs the clamp voltage in relation to a difference between the reference current and the sense current.

4. The apparatus of claim 1, wherein the load device comprises an actuator coil of a voice coil motor used to control rotary position of a head with respect to a rotating disc, and wherein the transistor is one of four such transistors arranged in an H-bridge driver circuit which applies bi-directional current through the actuator coil.

5. A disc drive, comprising:
 an actuator which supports a head adjacent a rotatable disc and a coil adjacent a permanent magnet; and
 a servo circuit, connected to the coil, which applies bi-directional current through the coil to rotate the actuator, comprising:
  four current sensing metal oxide semiconductor field effect transistors which are operably configured to form an H-bridge with the coil, each transistor having separately insulated gate, source and drain and sense terminals with a source to drain conductivity determined in relation to a voltage applied to the gate terminal and a sense current from the sense terminal determined in relation to a magnitude of source to drain current;
  a driver circuit which applies drive voltages to the gate terminals of alternating pairs of the transistors to pass a desired load current through the coil, wherein the drive voltages are selected to place a selected pair of the transistors in a conductive state and the remaining pair of the transistors in a nonconductive state; and
  a clamp circuit, connected to the gate terminals of at least one transistor from each of the pairs of the transistors, which uses the sense current from the associated sense terminal to maintain the associated transistor in a quiescent state irrespective the magnitude of the drive voltage.

6. The disc drive of claim 5, wherein the clamp circuit is connected to the gate terminals of all four transistors.

7. The disc drive of claim 5, wherein the clamp circuit comprises:
 a reference voltage generator which generates a reference voltage;
 a resistor which generates a sense voltage in relation to a voltage drop across the resistor as a selected sense current passes through the resistor; and
 a differential amplifier, connected to the reference voltage generator and the resistor, which outputs the clamp voltage in relation to a difference between the reference voltage and the sense voltage.

8. The disc drive of claim 7, wherein the clamp circuit further comprises a forward biased diode connected in series between the differential amplifier and the driver circuit.

9. The disc drive of claim 5, wherein the clamp circuit comprises:
 a reference current generator which generates a reference current; and
 a transconductance amplifier, connected to the reference current generator and a selected sense terminal, which outputs the clamp voltage in relation to a difference between the reference current and the associated sense current.

10. The disc drive of claim 9, wherein the clamp circuit further comprises a forward biased diode connected in series between the differential amplifier and the driver circuit.

11. A disc drive, comprising:
 an actuator which supports a head adjacent a rotatable disc and a coil adjacent a permanent magnet; and
 control means for applying current to the coil to control head position.

12. A method for applying load current to a load device, comprising steps of:
 (a) arranging four current sensing metal oxide semiconductor field effect transistors which are operably configured to form an H-bridge with the coil, each transistor having separately insulated gate, source and drain and sense terminals with a source to drain conductivity determined in relation to a voltage applied to the gate terminal and a sense current from the sense terminal determined in relation to a magnitude of source to drain current;
 (b) applying drive voltages to the gate terminals of alternating pairs of the transistors to pass a desired load current through the coil, the drive voltages selected to place a selected pair of the transistors in a conductive state and the remaining pair of the transistors in a nonconductive state; and
 (c) using the sense currents from the sense terminals to clamp the drive voltages applied to the remaining pair of transistors to levels sufficient to maintain the transistors in a quiescent state.

13. The method of claim 12, wherein the using step (c) comprises steps of:
 (c1) passing the sense currents through respective sense resistors to generate sense voltages;
 (c2) providing a reference voltage; and
 (c3) adjusting drain to source current through the respective transistors in relation to differences between the respective sense voltages and the reference voltage.

14. The method of claim 12, wherein the using step (c) comprises steps of:
 (c1) providing a reference current; and
 (c2) adjusting drain to source current through the respective transistors in relation to differences between the respective sense currents and the reference current.

* * * * *